(12) United States Patent
Mohr et al.

(10) Patent No.: US 7,929,218 B2
(45) Date of Patent: Apr. 19, 2011

(54) VARIABLE LENS

(75) Inventors: Thomas Mohr, Jena (DE); Manfred Dick, Gefell (DE); Juergen Kuehnert, Jena (DE)

(73) Assignee: Carl Zeiss Meditec AG, Jena (DE)

( * ) Notice: Subject to any disclaimer, the term of this patent is extended or adjusted under 35 U.S.C. 154(b) by 628 days.

(21) Appl. No.: 11/883,287

(22) PCT Filed: Feb. 7, 2006

(86) PCT No.: PCT/EP2006/001039
§ 371 (c)(1),
(2), (4) Date: Jul. 30, 2007

(87) PCT Pub. No.: WO2006/084653
PCT Pub. Date: Aug. 17, 2006

(65) Prior Publication Data
US 2008/0310031 A1    Dec. 18, 2008

(30) Foreign Application Priority Data

Feb. 9, 2005   (DE) .......................... 10 2005 005 933

(51) Int. Cl.
*G02B 1/06* (2006.01)
(52) U.S. Cl. ........................................ 359/665; 359/666
(58) Field of Classification Search .................. 359/665, 359/666
See application file for complete search history.

(56) References Cited

U.S. PATENT DOCUMENTS

| | | | |
|---|---|---|---|
| 4,079,368 A | 3/1978 | DiStefano | |
| 4,583,824 A | 4/1986 | Lea | |
| 6,369,954 B1 | 4/2002 | Berge et al. | |
| 6,449,081 B1 | 9/2002 | Onuki et al. | |
| 6,806,988 B2 * | 10/2004 | Onuki et al. | 359/253 |
| 2004/0227063 A1 | 11/2004 | Viinikanoja | |
| 2004/0228002 A1 | 11/2004 | Schrader | |

FOREIGN PATENT DOCUMENTS

| | | |
|---|---|---|
| DE | 698 04 119 T2 | 11/2002 |
| EP | 1 069 450 A2 | 1/2001 |
| WO | WO 03/107087 A1 | 12/2003 |
| WO | WO 2004/005133 A1 | 6/2004 |
| WO | WO 2004/077124 A1 | 9/2004 |
| WO | WO 2004/099846 A1 | 11/2004 |
| WO | WO 2004/102252 A1 | 11/2004 |
| WO | WO 2004/003842 A1 | 1/2005 |
| WO | WO 2005/006029 A1 | 1/2005 |
| WO | WO 2005/096069 A1 | 10/2005 |

* cited by examiner

*Primary Examiner* — Jack Dinh

(74) *Attorney, Agent, or Firm* — Patterson Thuente Christensen Pedersen, P.A.

(57) ABSTRACT

The invention relates to a variable lens for controlling electromagnetic radiation that interacts with said lens in a controlled manner. The lens includes a container; a first dielectric fluid that is held in the container; a second dielectric fluid that is held in the container, a phase boundary layer between the first and the second fluid. The relative dielectric constant of the first fluid is different from a relative dielectric constant of the second fluid. At least one first electrode; and at least one second electrode is positioned in relation to the first electrode in such a way that an electric current that is applied between the first and the second electrode generates an electric field, which infiltrates the phase boundary layer.

54 Claims, 10 Drawing Sheets

VARIABLE LENS

Related Applications

This application claims priority to PCT Application No. PCT/EP2006/001039, filed Feb. 7, 2006 and German Application No. 10 2005 005 933.3, filed Feb. 9, 2005, the disclosures of which are hereby incorporated by reference in their entirety.

Field of the Invention

The present invention relates to a variable lens, and in particular to a lens, the interactive properties of which can be influenced with electromagnetic radiation (for instance light including IR and/or UV light). The invention particularly relates to a variable lens for controllably influencing the radiation that interacts with the lens.

BACKGROUND OF THE INVENTION

It is known from imaging optics that monochromatic image quality is negatively affected by higher order aberrations. Production of aspherical lenses or reflecting lenses for eliminating or suppressing these aberrations has become known. It is also possible to compensate fixed aberrations with monolithic phase plates in order to improve image quality.

Variable lenses are known, the variability of which is based on a change in the distance between two optical elements: those for which the variability is based on a change in the refractive index and those for which the variability is based on a change in the surface curvature. The latter include those that have recently come on the market and in which the change in the surface curvature is attained in that the contact angle between a liquid and a surface is influenced by applying an electrical voltage. Such an apparatus is described for instance in the translated European patent DE 698 04 119 T2, full disclosure of which is hereby included by reference.

In known variable lenses, it is only possible to make large-range variable adjustments in the dioptric refractive power (currently, in accordance with the prior art higher aberrations can only be dynamically corrected with small amplitudes<10 μm for instance with adaptive mirrors or adaptive liquid crystal lenses). Simultaneously correcting the dioptric refractive power in the range of up to 20 D and any higher aberrations using an optical element is not previously known.

It has been determined that such known devices are inadequate in two respects: first, they only permit the dioptric refractive power to be influenced, which is not adequate for many applications; second, the quality of the optical effect in such an arrangement is not adequate for many requirements.

It is therefore the object of the invention to provide a variable lens that is more versatile or/and more precisely controllable.

SUMMARY OF THE INVENTION

For this purpose the invention suggests a variable lens, in particular a lens without a membrane, in accordance with the independent claims.

The intrinsic reason for the inadequate function of known variable lenses is above all gravitational and temperature factors.

Errors in the shape of the boundary surface that are functions of gravity and temperature can be inventively compensated with a correction in that a certain correction potential profile is applied to the individual electrodes. The correction profile can be adjusted individually and dynamically. Multiple correction profiles can be stored and assigned to a certain application.

As a first aspect, an inventive variable lens has a container with two dielectric fluids contained therein, between which [fluids] a phase boundary surface is embodied. Furthermore, the lens has at least two electrodes for applying a voltage so that an electrical field is built up that passes through the phase boundary surface.

By changing the position of the boundary limit based on the voltage adjusted, the properties of the lens can be intentionally changed. Depending on the geometry of the container or/and of the electrodes, this provides asphericity of the boundary surface or an existing asphericity is reduced or eliminated.

As a second aspect of the invention, the container contains one conductive and one dielectric fluid that embody therebetween a phase boundary surface that is in contact with the container along a wall area. Furthermore, the lens has at least two electrodes for applying voltage, of which one electrode is arranged in another wall area that is arranged at an angle to the aforesaid wall area.

As a third aspect of the invention, the container contains one conductive and one dielectric fluid that embody therebetween a phase boundary surface. Furthermore, the lens has at least two electrodes for applying voltage, of which one electrode is arranged in a transparent wall area.

In another aspect of the invention, one of the fluids is reflective, in particular one of the fluids is a metallic fluid.

The manner in which the invention functions can be explained in that, by applying voltage to the electrodes in the dielectric fluid, an inhomogeneous electrical field is embodied that exerts a force on this fluid. The boundary surface then changes its position such that the force exerted on the fluid is compensated by a counter-force provided by the surface tension of the boundary surface.

In order, for instance, to reduce acceleration and positional influences, liquids with a similar or identical density can be provided as the fluids.

Mutually opposing wall areas of the container can have transparent areas through which a beam path can be guided. This beam path can pass through the boundary surface and/or be reflected on it, whereby the (main) curvatures of the boundary surface can be influenced by the voltages applied.

However, the beam path can also be limited by the one fluid in that this fluid is partially or largely non-transparent. In this case, the other, transparent fluid is in contact with the mutually opposing wall areas of the container, whereby the non-transparent fluid surrounds at least one of the contact areas. The beam limit is influenced in terms of shape or/and size by a voltage applied to the electrodes.

Similarly, the two fluids can have different spectral transmissions. In such a case, the central beam, which passes through only one of the fluids, has a spectral distribution upon exiting that is different from a circumferential or peripheral beam that passes through both fluids. The latter thus has a different color than the central beam and can be controlled using the voltage applied in terms of its portion at the pass-through surface.

If the boundary surface is reflective, after (total) reflection on the boundary surface, an incoming beam of light striking that passes through a circumferential wall of the container can exit again through an opposing part of the circumferential wall. The site and/or angle of the exit of the light is influenced by applying a voltage to the electrodes.

The container can be arranged in a parallel beam path, whereby a divergent light beam exiting from a light source is collimated by a collimator lens. Due to the voltage applied to the electrodes, the result is that the intensity distribution of the light passing through the chamber can be influenced at a distance from the boundary surface that equals the reciprocal refractive force of the boundary surface.

The container can also be arranged between a gap through which radiation to be analyzed passes and a detector that is sensitive to this radiation. As a consequence of the wavelength-dependent light refraction on the boundary surface, the spectral range registered by the detector varies for the radiation to be analyzed.

The container can also be arranged in a collimated beam path such that a light beam passing through the container is guided in a direction that can be selected by applying voltage to the electrodes.

BRIEF DESCRIPTION OF THE DRAWINGS

Additional advantageous embodiments and aspects of the invention are described in the dependent claims and the following examples using the figures.

DETAILED DESCRIPTION

Figure 1:
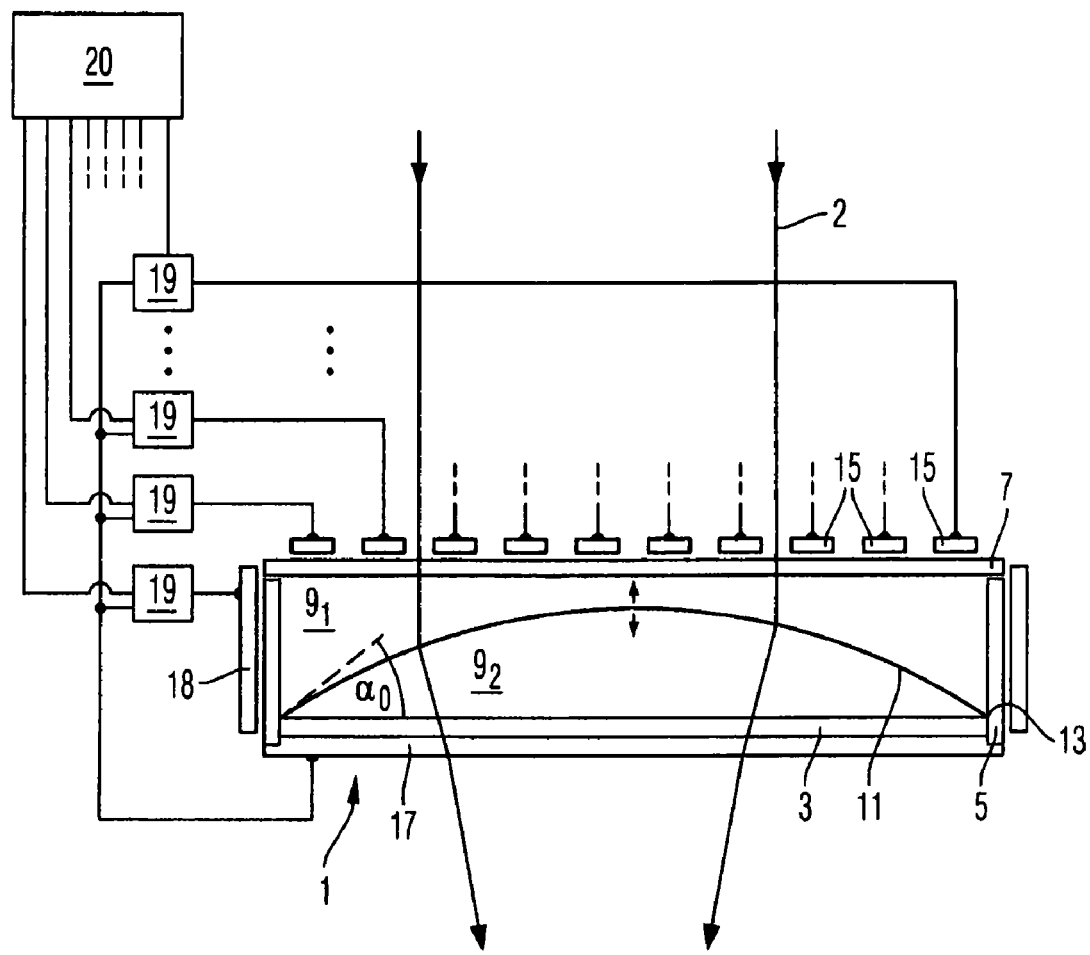
FIG. 1 depicts an inventive variable lens with two dielectric units.

FIG. 1 depicts a variable lens in which a chamber 1 has a base area 3, an edge area 5, and a cover area 7. The chamber 1 contains two dielectric fluids $9_1$ and $9_2$ with densities $d_1$ and $d_2$, dielectric constants $\in_1$ and $\in_2$, and refractive indices $n_1$ and $n_2$, respectively. Due to their limited miscibility, the two fluids form a (phase) boundary surface 11 between them. Both fluids can be slightly soluble in a different fluid. The boundary surface 11 is limited by a circumferential area 13 that is part of the chamber 1. In addition, the two fluids $9_1$ and $9_2$ have adhesions to the surface material of the circumferential area 13 and cohesions, from which a contact angle $\alpha_0$ results between the surface of the circumferential area 13 and the boundary surface 11.

Furthermore the chamber 1 has electrodes 15, 17 that in this example are arranged on the cover area 7 and the base area 3. In this example the chamber 1 is cylindrical, the electrode 15 comprises a plurality of concentric, annular individual electrodes, and the electrode 17 is transparent and covers the base 3. In addition, a control electrode 18 arranged about the chamber is provided. The chamber can alternatively also be cuboid, or/and the electrodes can each be strip-like or polygonal. In addition, a plurality of electrodes can be provided. Furthermore, if arranged on a part of the chamber wall through which a light beam passes (see below) and therefore transparent, the electrodes can be made from indium-tin oxide (ITO).

Depending on the resistance desired, ITO layers have a thickness of about 15 to 310 nm and are preferably separated from the substrate, that is, from the cover, by an $SiO_2$ layer that is 20 to 70 nm thick. Such layers have a transmission degree of more than 80%. It is preferred when adjacent transparent electrodes are separated by an area of a likewise transparent, but insulating, material that preferably has the same or a similar refractive index as the electrode material in order to reduce the differences in transit times. Furthermore, in order to reduce distorting influences in the electrode supply lines a grid-shaped ground electrode can be arranged between the top cover glass and the control electrodes so that the field lines are bundled locally in the grid openings.

The electrodes are connected to voltage sources 19 that can be regulated by a control computer so that when a voltage is applied an electrical field builds up in each of the dielectric fluids $9_1$ and $9_2$. As a result of the electrode geometry or/and the curved border surface between dielectric units with different dielectric constants, the electrical field built up is non-homogeneous and discontinuous at the boundary surface and therefore effects a force on the dielectric units and their boundary surface. This deforms the boundary surface so that a counter-force occurs due to the surface tension. The boundary surface in equilibrium assumes a shape such that force and counter-force compensate one another. Suitable dielectric units are for instance water ($\in\approx 80.4$) and a carbohydrate mixture of similar density ($\in\approx 2.2$).

For a beam 2 passing through the transparent cover area 5 and base area 3, the chamber 1 together with the fluids contained in it acts like a lens, the effect of which is converging or diverging depending on the difference in the refractive indices $n_1$ and $n_2$ and depending on the boundary surface curvature. In the depicted example the boundary surface 11 for a beam 2 entering from above is convex, and the refractive index of the second fluid is higher than that of the first fluid so that there is a converging effect. If a voltage is applied to the electrodes, the shape of the boundary surface changes and the converging effect of the liquid lens is influenced to a greater or lesser extent as a function of the amount of voltage. Since the contact angle a in this example is not affected, and the cylinder symmetry of the arrangement is maintained, the voltage-dependent influence is comprised primarily in a flattening or steepening of the boundary surface in the center area (indicated by the arrow in FIG. 1), accompanied by a displacement of a peripheral area of the boundary surface in the opposing direction because the volume of the fluids remains largely the same (apart from electrostriction). If the two fluids have nearly the same density ($d_1 \approx d_2$), the result when there is no voltage is a nearly perfectly spherical boundary surface (minimum surface) so that an applied voltage causes a certain radially symmetrical asphericity. If the fluids do not have the same density, so that when there is no voltage the boundary surface is not spherical, the asphericity can be reduced using a suitable applied voltage.

Figure 14:
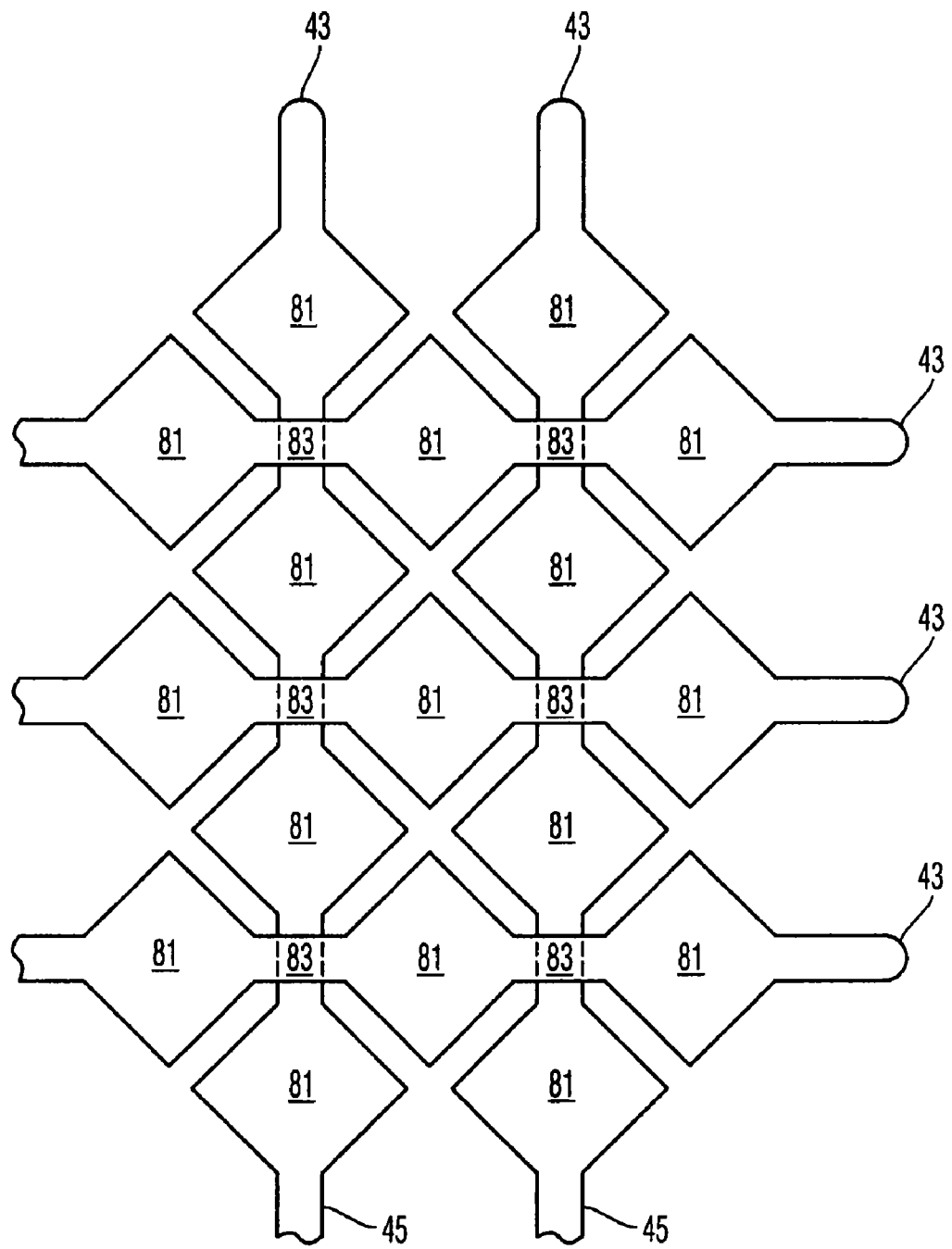
FIG. 14 depicts an exemplary arrangement of a plurality of electrodes which can be individually activated and, FIG. 15 depicts a cut-out of an exemplary electrode arrangement in a variable lens in accordance with the invention for providing a lens array.

In one variant of the lens described in the foregoing, at least one of the electrodes, for instance the electrode arranged on the cover area, is not annular or circular but rather is formed from a plurality of essentially linear electrodes that cross one another. FIG. 14 illustrates one exemplary arrangement. Individually adjustable voltages are applied to each of the electrodes. Using suitable symmetrical selection of the voltages results in a nearly toroid distortion of the boundary surface, the orientation of the main axes being determined by the voltages of the mutually crossing electrodes. Asymmetric voltage distribution results in a lateral displacement of the boundary surface relative to the position of the optical axis for a null field. If the narrow points 83 of the electrodes 41 have sufficient electrical resistance, a potential difference applied to both of its ends 43, 45 causes a flow of current through the flat and therefore better conducting parts 81 of the electrodes 41, and thus causes a step-like drop in voltage along their longitudinal extent. Thus an electrical potential can be largely freely adjusted for each part 81 of the surface covered by such an electrode arrangement 16. If a potential pattern is provided by such a plurality of electrodes, the boundary surface is thereby deformed correspondingly. During the further course of the light 2 passing through, depending on the distance from the lens, this results for each cross-section in a largely freely shapeable intensity pattern.

On the other hand, the electrodes can also be arranged concentricly, but in sectors, so that different sectors can be activated with different voltages. This moves the boundary surface laterally if mutually opposing sectors are activated in opposing directions, or for instance distorted into an oval.

The distances between adjacent transparent structures preferably may range from 5 μm-100 μm, but can also be from 2 μm up to 400 μm. The total number of electrode strips is at least 10 to 40, but depending on application can even be up to 1000 or even 4000. Activation is for instance digital, for example with approx. 1000 steps, whereby both positive and negative voltages are possible. The voltage variations may occur within a few milliseconds (for instance 3 milliseconds). The field strength generated is locally in the range of up to 1000 V/m, preferably up to 400 V/m; field gradients, that is local variations in the field strength, range up to about 10 kV/cm², in particular up to about 10 kV/m².

The arrangement of the electrode structures can be grid-like or, for compensating special optical errors, circular or ellipsoidal.

For permanent application of a certain field distribution, the electrodes can be formed by separated, preferably transparent charging islands like those of a flash memory that have a certain charge distribution applied and that retain this charge distribution for an extended period.

In the variants depicted in the following, corresponding components are labeled with the same numbers in terms of structure or/and function, but with different lower-case letters for the purpose of differentiation.

Figure 2:
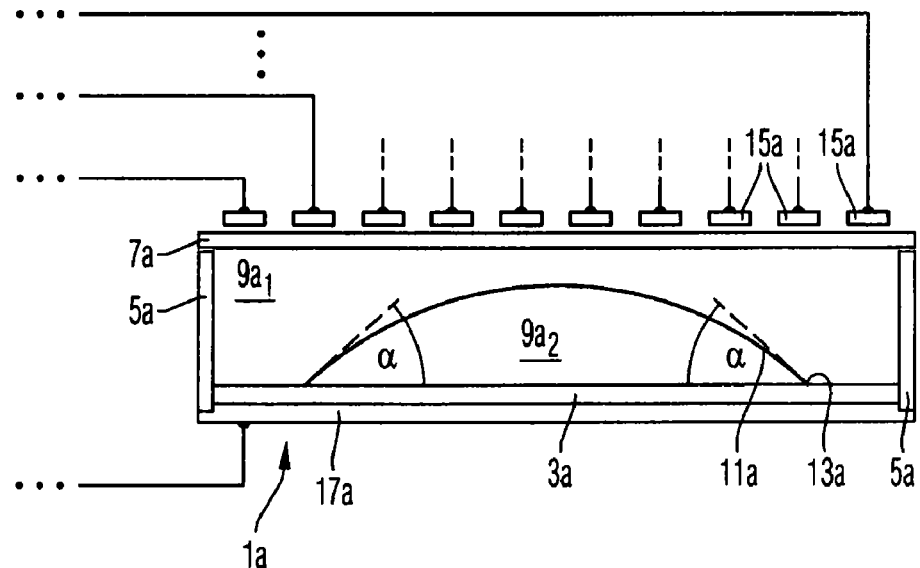
FIG. 2 depicts an inventive variable lens with two dielectric units and electrodes in the cover area and in the base area.

FIG. 2 depicts an arrangement in which the circumferential area 13*a* is opposite one of the electrodes 17*a*; the voltage control part is the same as that illustrated in FIG. 1. Due to the different dielectric constants of the two fluids 9*a*$_1$ and 9*a*$_2$, the field strength, and thus the field line density on the one hand, and the field line direction on the other hand, is different in the two fluids, so that again a force is exerted onto the boundary surface 11*a* between the fluids 9*a*$_1$ and 9*a*$_2$. The boundary surface can be largely freely shaped by selecting different potentials on the electrodes 15*a*.

Figure 3:
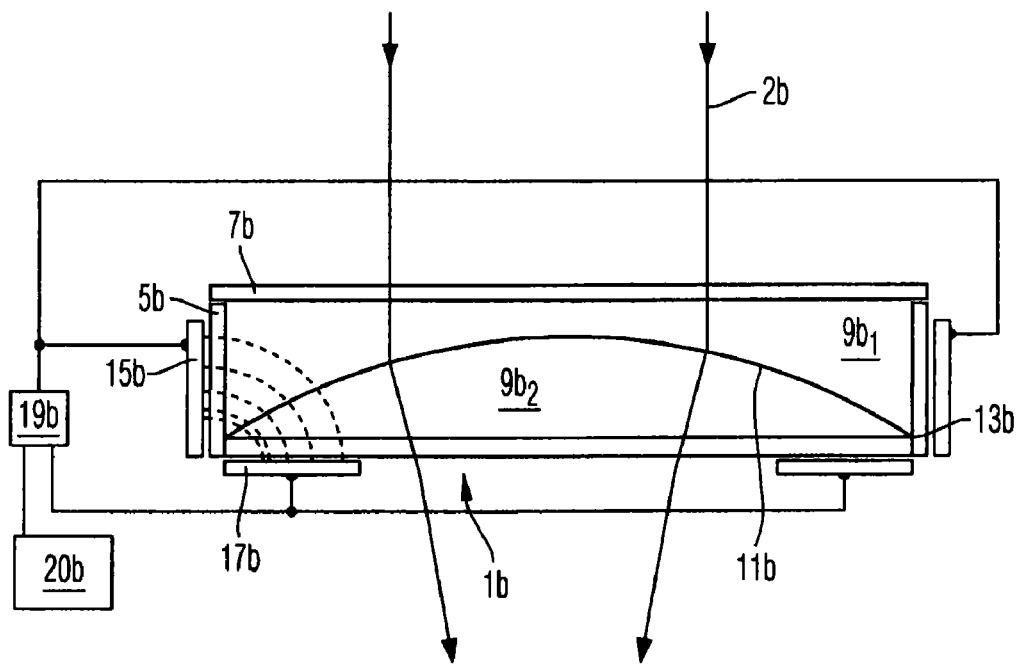
FIG. 3 depicts a variable lens in accordance with the first embodiment that has two dielectric units and one electrode on the circumferential wall.

In the arrangement depicted in FIG. 3, an annular electrode 17*b* is arranged at the base area 1*b*, while a counterelectrode 15*b* is arranged on the edge area 3*b*. In the illustrated example, the boundary surface edge adjacent to the circumferential area 13*b* opposes the counter-electrode 15*b* in the edge area 3*b*. Again this is an area of high field strength (indicated by broken field lines), and due to the arrangement of the electrodes 15*b* and 17*b* at an angle to one another the field inhomogeneity is also high. Thus, in this example the shape of the boundary surface is also influenced by the voltage applied to the electrodes 15*b* and 17*b*.

In all of these variants and embodiments, it is preferred when the denser fluid is arranged on the bottom, regardless of whether the base area or cover area is arranged on the bottom. If the difference between the densities of the fluids is small enough, in particular the relative difference in density $\Delta d = 2 \cdot |d_1 - d_2|/(d_1 + d_2)$ is less than 0.1, the variable lens can also be arranged on an incline to the direction of gravitational force or with the only slightly denser fluid on top. In some applications an acceleration direction can be the equivalent of the direction of gravitational force.

In the framework of this application, dielectric units are construed to be those substances whose conductivity is zero or is so small that for them a real static dielectric constant can be given, in particular less than 1 S/m, preferably 0.1 S/m, or their specific electrical resistance is greater than 1 Ω·m, preferably 10 Ω·m. Those fluids whose specific electrical resistance is less than 1 Ω·m or whose conductivity is greater than 1 S/m, are considered conductive in the context of this application; among these are for instance adequately concentrated aqueous saline solutions. When using saline solutions, for avoiding electrolysis effects it is preferred to use a low frequency alternating voltage, for instance in the frequency range below 10000 Hz, preferably from 100 to 2000 Hz, instead of direct voltage.

Figure 4:
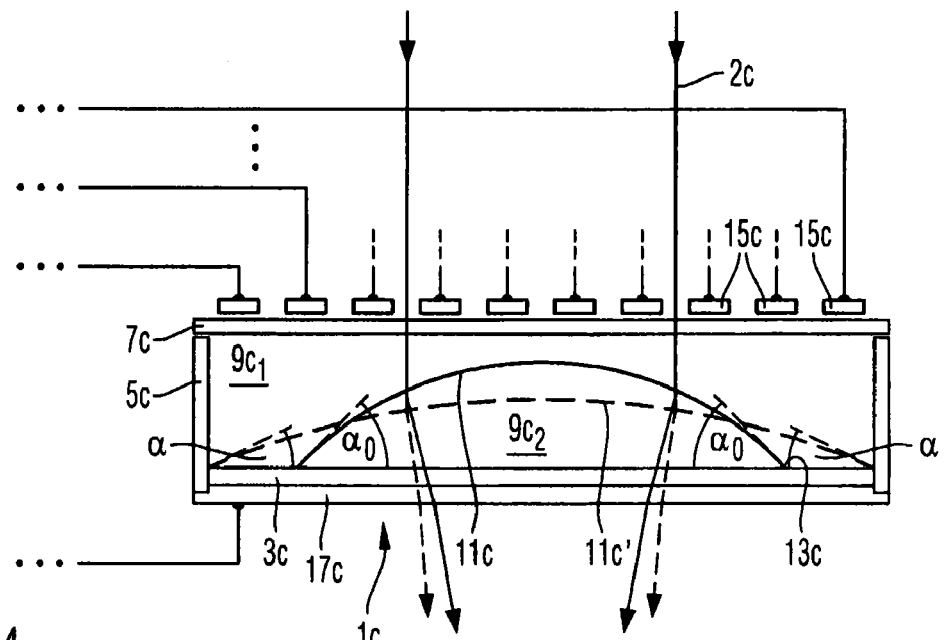
FIG. 4 depicts a variable lens in accordance with a second embodiment with a conductive liquid and electrodes in the cover area and in the base area.

In the arrangement depicted in FIG. 4, such a conductive liquid 9*c*$_2$ is arranged below a dielectric fluid 9*c*$_1$; otherwise the structure of this variable lens is similar to that shown in FIG. 2. Since the liquid 9*c*$_2$ is conductive—it is for instance a 20% aqueous LiCl solution or $Na_2CrO_4$ solution—its surface, that is also its boundary surface to the dielectric fluid 9*c*$_1$—for instance a phenylmethyl siloxane mixture with an addition of carbon tetrabromide, the density of which is the same as the density of the saline solution—represents an equipotential surface on which the electrical field lines are vertical. This means that the field built up in the dielectric fluid 9*c*$_1$ by applying a voltage to the electrodes 15*c*, 17*c* is inhomogeneous. In addition, the applied voltage produces a charge excess in the part of the conductive liquid that opposes the electrode 17*c*. Due to the capacity that occurs including the interposing parts of the bottom area 3*c*, a new, voltage-dependent contact angle α is created between the boundary surface 11*c* and the surface of the base area. A change in the contact angle, with the volumes of the fluids remaining the same, also means a change in the boundary surface shape, for instance, a flattening. Since the refractive indices of the fluids are different, the optical properties of the lens also consequently change with the voltage; in the example of a flattening of the boundary surface, the refractive force of the boundary surface 11*c* decreases. In terms of being able to adjust the boundary surface curvature as precisely as possible, it is preferred when the chamber wall, at least in the environment of the circumferential area, is embodied in a manner that limits a contact angle hysteresis δα, preferably to 2° or less (δα≦2°).

In the embodiments and variants described, the base area and cover area of the chamber are planar and mutually parallel; in one preferred embodiment, however, they can also individually or both have a concave or in particular a convex shape. In the latter case, there does not have to be an edge area in that bottom area and cover area of the chamber are in direct contact and together form a planar convex or biconvex lens shape. In special applications, base area and cover area of the chamber can be planar and at mutual angles to one another, forming a prism shape. In special cases, the base area and cover area can comprise optically transparent materials with an optical effect. The base area and cover area can be planar, convex, concave, aspherical, or can have a diffractive structure. Thus a desired refractive and diffractive effect is obtained. The transparent electrodes are applied to flat or curved surfaces. In these cases an optical effect results just from the curvature of the exterior surfaces of the fluids or their slope to one another. In addition, there is the variable optical effect of the boundary surface that can be influenced by applying a voltage to the electrodes.

Furthermore, cover area, base area, and where necessary edge area can comprise different, especially dielectric, materials, or can have different surface processing. In particular with respect to the fluids contained in the chamber, they can have different adhesion (wetting strength) and thus [different] contact angles. It is also possible to provide areas with different adhesion in one or more of these areas, for instance in a concentric arrangement about an optical axis in order to promote centering of the fluids about this axis. It is particularly preferred when the fluid arranged in contact with the cover area has a higher adhesion to its surface than to the surface of the base area, or/and the fluid in contact with the base area has a higher adhesion to its surface than to the surface of the cover area. In an arrangement such as in FIG. 2 or FIG. 4, it is preferred when the fluid arranged in contact with the edge area has a higher adhesion to its surface than to the surface of the bottom area. These arrangements promote the strength of the boundary surface.

Figure 5:
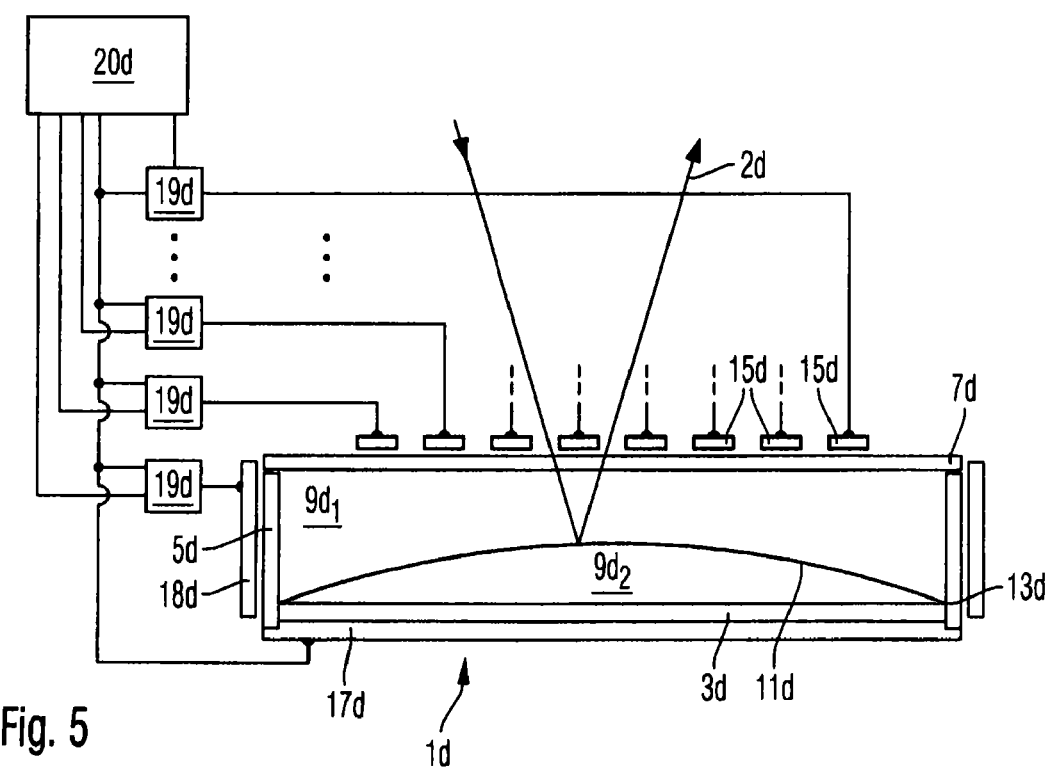
FIG. 5 depicts a variable lens with a directly contacted metal liquid and an electrode in the cover area.

In the embodiment depicted in FIG. 5, the boundary surface $11d$ is reflective, so that a light beam reflected on the boundary surface $11d$ does not pass through base area and cover area of the variable lens. In the illustrated embodiment, the bottom fluid $9d_2$ is a metallic liquid, and the incoming light beam $2d$ is largely reflected at its boundary surface $11d$. The boundary surface $11d$ thus acts as a mirror that can be adjusted using the voltage applied to the electrodes.

Suitable metallic liquids are for instance mercury, gallium-aluminum alloys and sodium-potassium alloys, whereby in particular cesium can be added to the latter. An alloy made of 78 at % K and 22 at % Na melts at −12.6° C. and has a density of 0.73 g/cm³. With a suitable hydrocarbon or hydrocarbon mixture as dielectric fluid, it is simple to adjust to equal densities. For instance, the density of n-decane is also 0.73 g/cm³ (melting point −29.7° C.), that of n-undecane is 0.74 g/cm³ (melting point −25.6° C.). Kerosene is also suitable and, depending on provenance, has a somewhat higher density and a somewhat higher melting point; adding an appropriate quantity of cesium to the alkali-metal alloy lowers its melting point and increases its density to the density of kerosene. Due to the high electrical conductivity of the alkali-metal alloys, the reflectivity of their boundary surface to a carbohydrate (mixture) is high.

Figure 6:
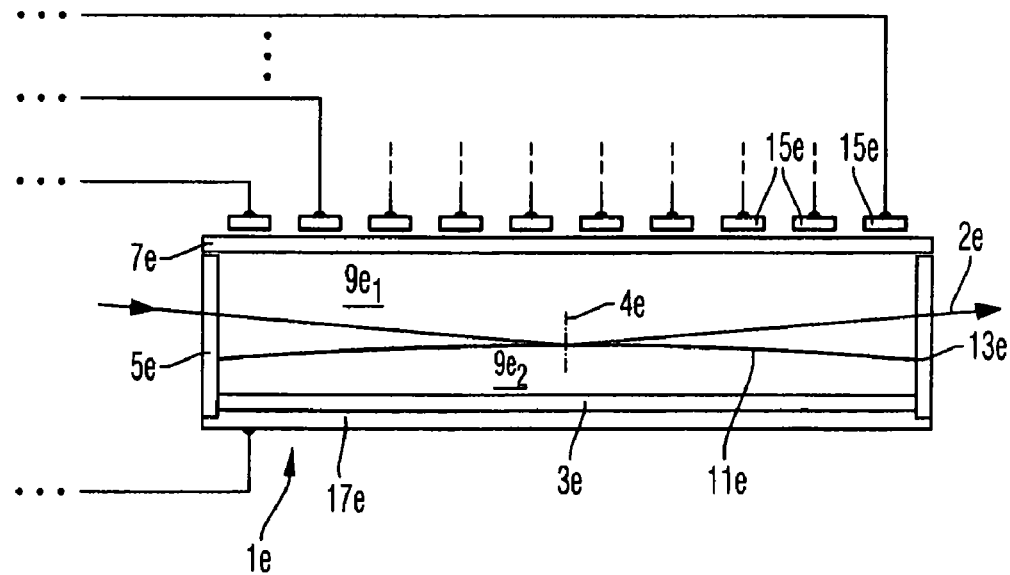
FIG. 6 depicts another variable lens with a totally reflecting boundary surface.

In addition, when their refractive indices are different, the boundary surface between non-metallic fluids is reflective to a certain degree. For some applications, for instance beam guide control purposes, a low degree of reflection is adequate. Particularly high reflectivity is observed on the boundary surface between an optically dense medium and an optically thinner medium (see FIG. 6) if the angle of incidence to the axis of incidence is large enough (total reflection). For instance, one of the fluids, $9e_2$, is a 20% aqueous LiCl solution with a density of 1.12 g/cm³ and a refractive index of 1.38; the other fluid, $9e_1$, is a solution of a few percent hydrocarbon tetrabromide in a phenylmethyl siloxane mixture, with the same density as the aqueous solution, and a refractive index of about 1.55. A boundary angle of the total reflection of 63° results from the ratio or these refractive indices; i.e. 100% of a light beam that strikes the organic/aqueous phase boundary surface at an angle of incidence of 63° or higher is reflected. The light beam $2e$ does not pass through the area about the axis of incidence $4e$, so that in this area non-transparent electrodes $15e$ can be arranged on the cover area $7e$ of the chamber $1e$. These electrodes $15e$ are situated in the immediate vicinity of the boundary surface $11e$ on the side of the dielectric (organic phase), and the field they generate thus acts with particular effectiveness on the boundary surface $11e$. It is preferred to guide the reflected light beam through the edge area $5e$ of the chamber $1e$, since this facilitates a more compact structure. This edge area $5e$ is preferably embodied such that the entering and reflected exiting light beam pass through opposing parts of the edge area such that effects of light refraction are minimized. The part of the edge area $5e''$ for the exiting light beam can be curved in the direction of the axis of incidence.

Figure 7:
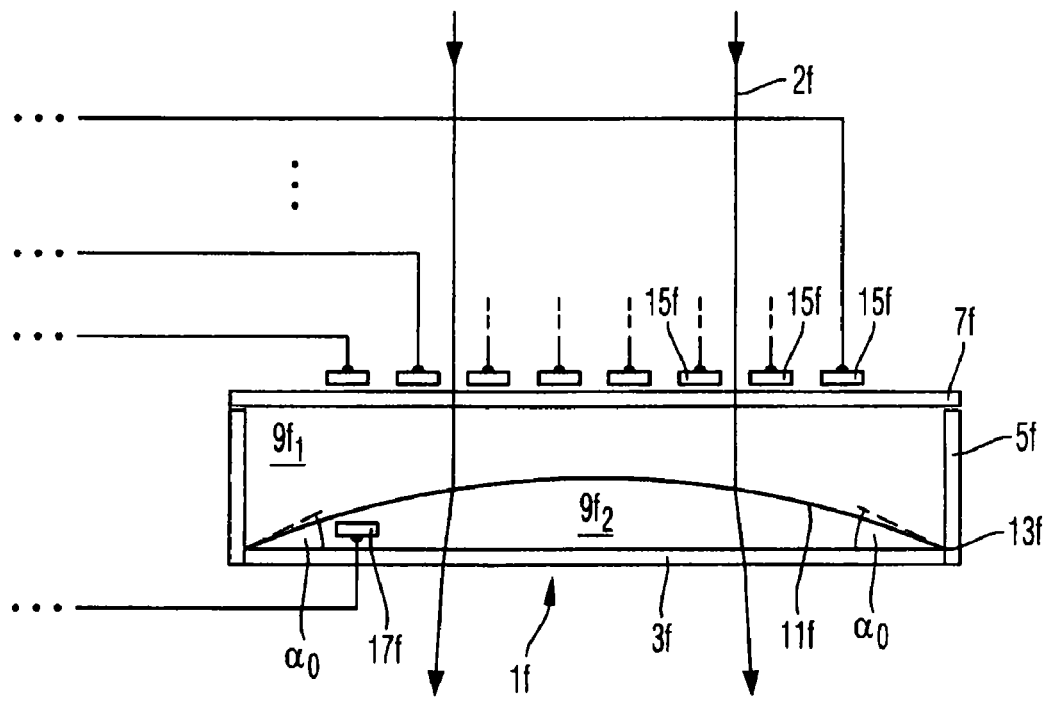
FIG. 7 depicts a variable lens in accordance with the third embodiment that has a directly contacted conductive liquid and an electrode in the cover area.
Figure 8:
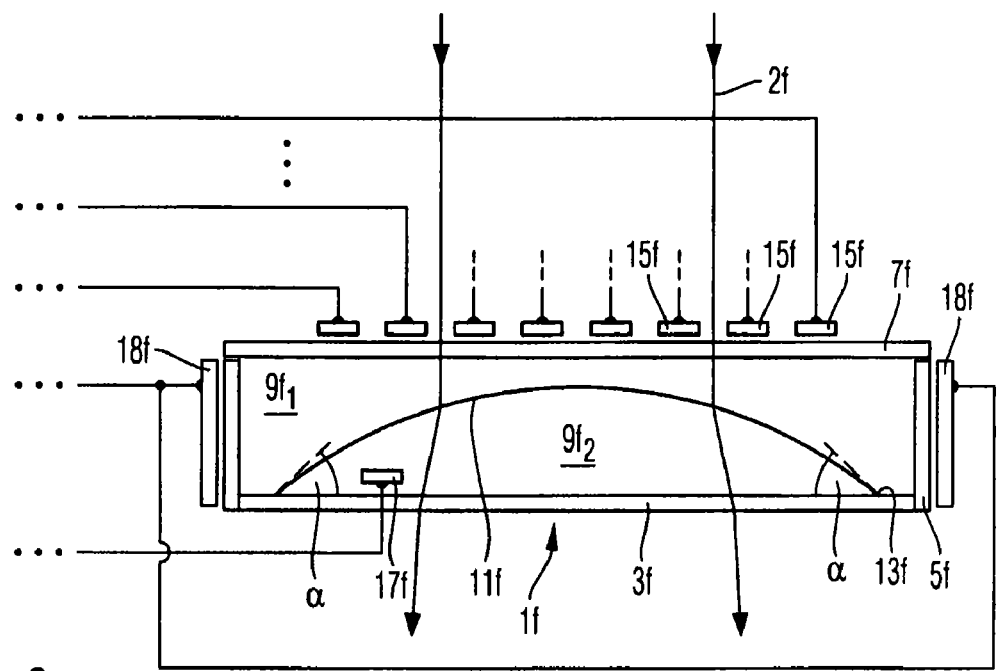
FIG. 8 depicts another variable lens in accordance with the third embodiment with a directly contacted conductive liquid and an electrode on the circumferential wall.

In FIGS. 7 and 8, a non-metallic but conductive liquid, for instance aqueous LiCl solution, is covered with a dielectric liquid. Since the dielectric liquid in this case has a higher refractive index than the aqueous solution, the lens in the depicted case of a convex meniscus has a dispersive effect on the light beam $2f$ passing through. The aqueous solution is contacted directly (galvanic) by an electrode $17f$. By means of counter-electrodes $15f$ removed from and in particular inclined toward the circumferential area $13f$, an inhomogeneous electrical field can again be built up in the dielectric liquid. The boundary surface again represents an equipotential surface, the potential of which is determined by the voltage applied. The contact angle α is largely determined by the surface quality of the circumferential area $13f$ and the adhesion and cohesion properties of the two liquids $9f_1$ and $9f_2$. In one variant, the galvanic contact can also be provided by a base area that is at least partially metallized.

Figure 9:
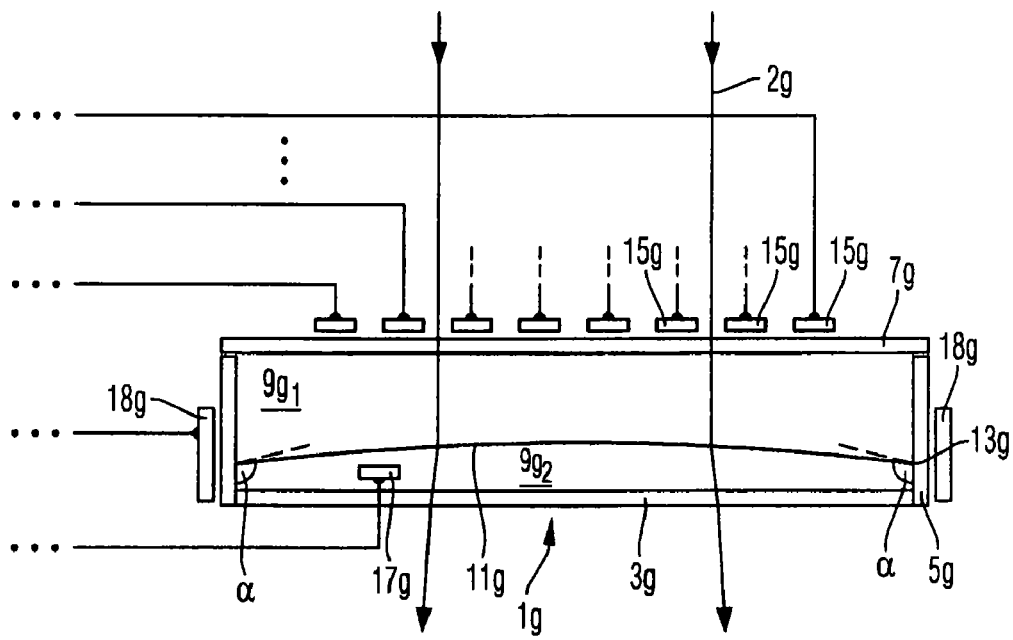
FIG. 9 depicts an inventive variable lens with an additional electrode for adjusting a contact angle.

In order also be able to influence the contact angle α, in the arrangement in FIG. 9 an electrode $18g$ that is not in contact with the liquid is provided in the circumferential area $13g$. Otherwise this arrangement is the same as that in FIG. 7. Due to the voltage applied to the electrode $18g$, a charge excess occurs at its surface opposing the conductive liquid at a different potential, and it [charge excess] is reflected with an identical charge excess with the opposite mathematical sign in the conductive liquid. Together the charged layers, with the interposing part of the base area of the chamber, form a voltage-dependent charged capacitor. The energy of this capacitor varies depending on the position of the circumferential area relative to the electrode $18g$, which results in a force on the boundary surface and a voltage-dependent variation in the contact angle. Thus, the contact angle, and therefore the curvature of the boundary surface, is adjustable with the voltage applied to the electrode $18g$. In addition, the opposing electrodes $15g$ produce an inhomogeneous field in the dielectric liquid, which field permits further influence on the boundary surface shape.

Figure 10:
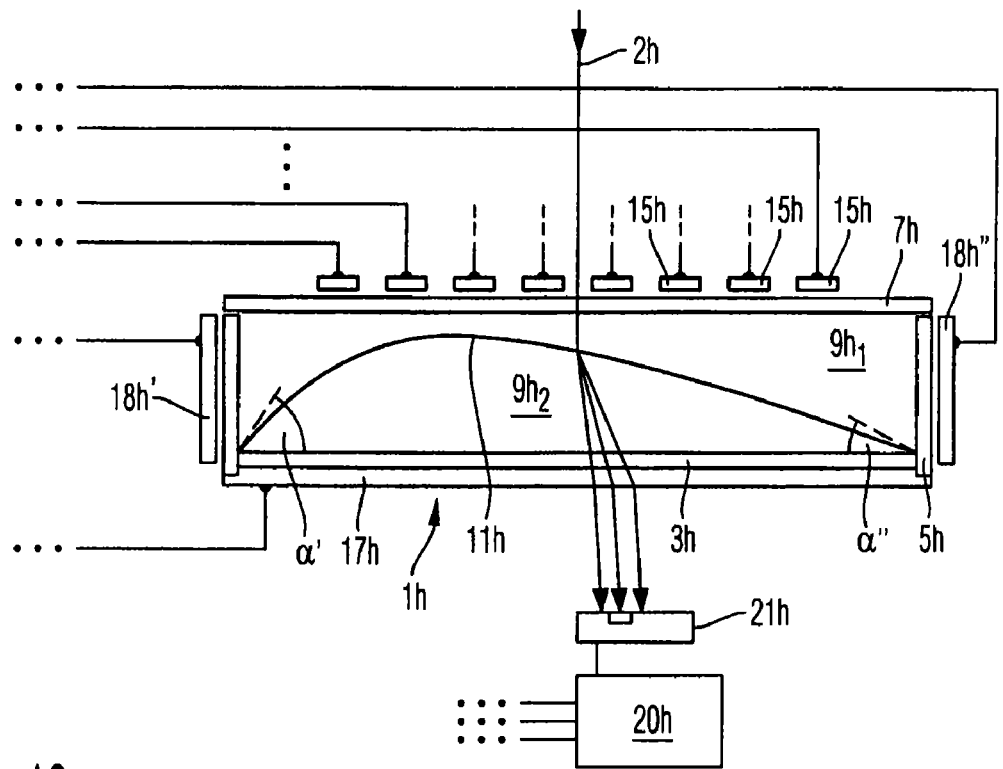
FIG. 10 depicts an inventive variable lens with a plurality of electrodes for adjusting a spectrally different angle of deflection.

If the two fluids have different refractive indices, as a rule the boundary surface between them results in spectrally different beam deflection. In that the angle of impact of a light beam $2h$ to be analyzed is influenced when a voltage is applied to the electrodes $15h$, $17h$ of a variable lens in accordance with FIG. 10, different spectral components of the light beam are also deflected differently. Each light-sensitive element of a detector $21h$ arranged in the area of the deflected light beam thus registers a different spectral component of the analyzed light depending on the voltage applied. Thus such an arrangement results in a spectrometer.

Figure 11:
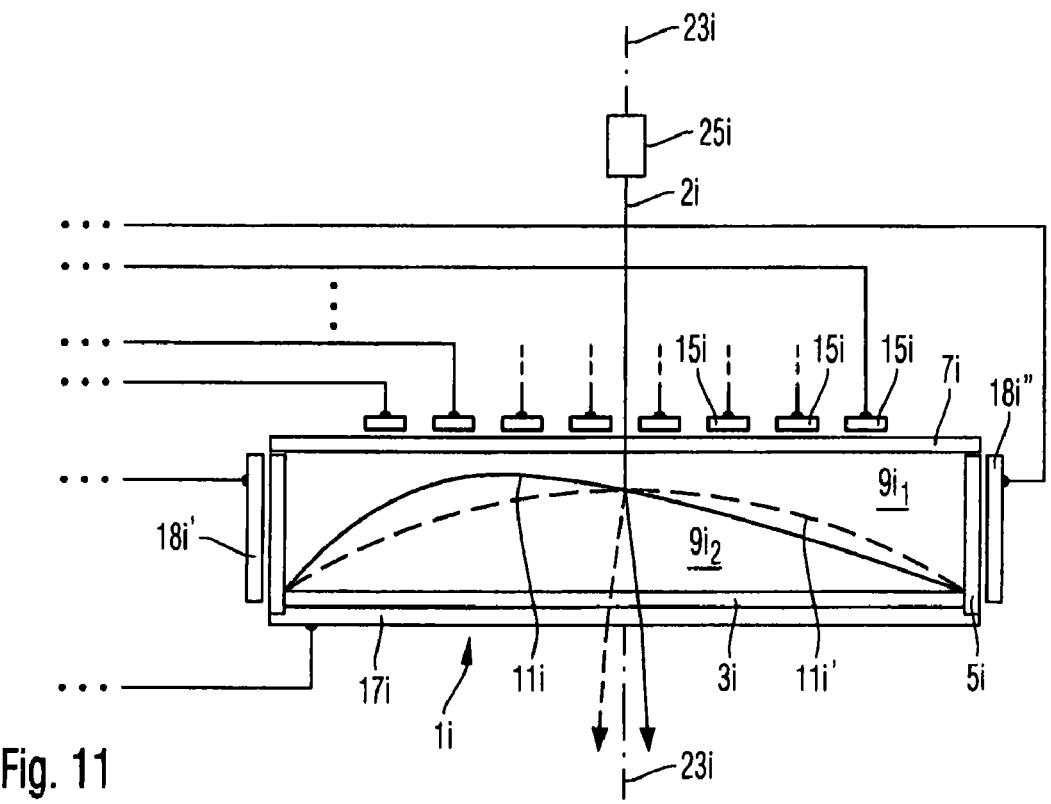
FIG. 11 depicts an inventive variable lens with a plurality of electrodes for providing an adjustable angle of deflection.

When the spectral composition does not play any role, for instance in a nearly monochromatic laser beam exiting from a corresponding light source $25i$, using an arrangement in accordance with FIG. 11 the entering light beam $2i$ is deflected, or if it is perpendicular is not deflected, in accordance with the voltage applied. In this case the chamber geometry is rectangular, which means the circumferential area $5i$ comprises four right corners. An electrode $18i'$, $18i''$ which can be individually activated, is arranged at each right corner so that the fluids $9i_1$, $9i_2$ contained in the chamber can be subjected to an electrical field that is transverse to direction in which the light beam $2i$ enters. This means that the boundary surface $11i$ is inclined asymmetrically to the optical axis $23i$ (broken line $11i'$), resulting in deflection, adjustable using the voltages applied, in one or both directions perpendicular to the beam direction. Thus, this arrangement is suitable for deflecting an incoming light beam (or infrared beam) in one or two mutually perpendicular directions. In the latter case, the deflection can be varied rapidly by voltages, in the form of a line-wise deflection, that vary to one another rapidly in a sawtooth-like manner in two mutually perpendicular directions and that are preferably commensurate in terms of their periods.

In one variant with a grid-like electrode structure as described in the foregoing, a plurality of deflected partial light beams can also be formed from the incoming light beam $2i$ in that differently deflecting fields are produced in different grids of the electrode structure.

Figure 12:
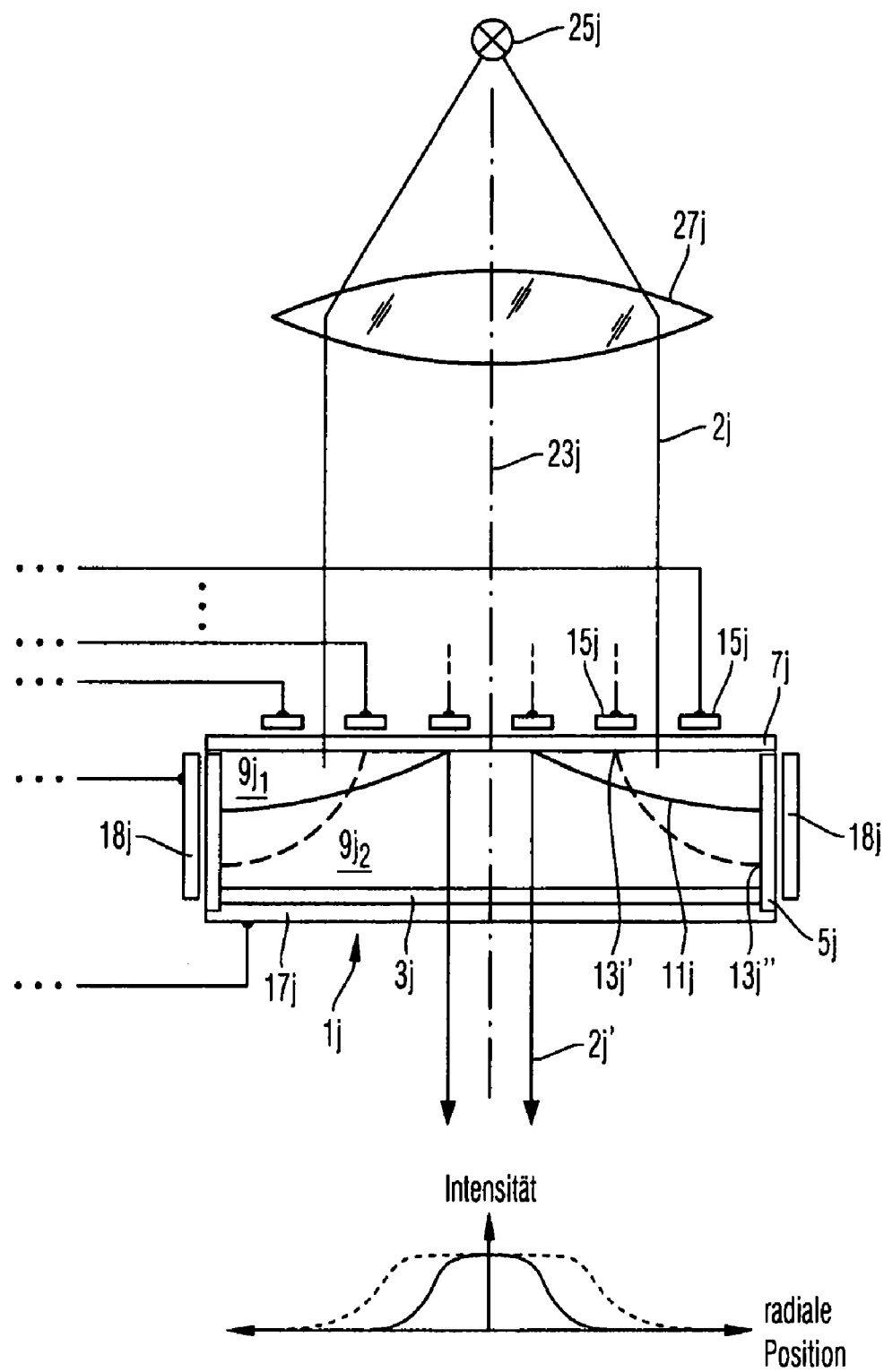
FIG. 12 depicts an inventive variable lens with different transparent fluids for providing an adjustable screen.

In the arrangement of the fluids in accordance with FIG. 12, one of the fluids $9j_2$ contacts both the cover area $7j$ and the base area $3j$ centrally, while the other fluid $9j_1$ touches the cover area $7j$ and parts of the edge area $5j$ only peripherally. This peripheral fluid $9j_1$ has a substantially lower transmission degree for a beam $2j$ that strikes the lens and that is parallelized using a collimator lens $27j$. In this arrangement, two circumferential areas $13j'$, $13j''$ occur, one at the end area, the other at the cover area. Cover area and base area could also be reversed. Influencing the boundary surface $11j$, and in particular its contact angle $\alpha$ in one of these areas, results in a change in diameter in the contact area $12j$ of the transparent fluid to the cover area and base area. A change in the voltages applied to the electrodes thus effects a change in intensity in the beam $2j'$ that is passing through. Such an arrangement provides an adjustable screen effect. Since the transmission degree at the circumferential area $13j'$ does not vary sharply but rather varies radially gradually because of the contact angle different by 90° (see the schematic intensity diagram in FIG. 12), such a screen also has the property of reduced bending effects in addition to adjustability.

Figure 13:
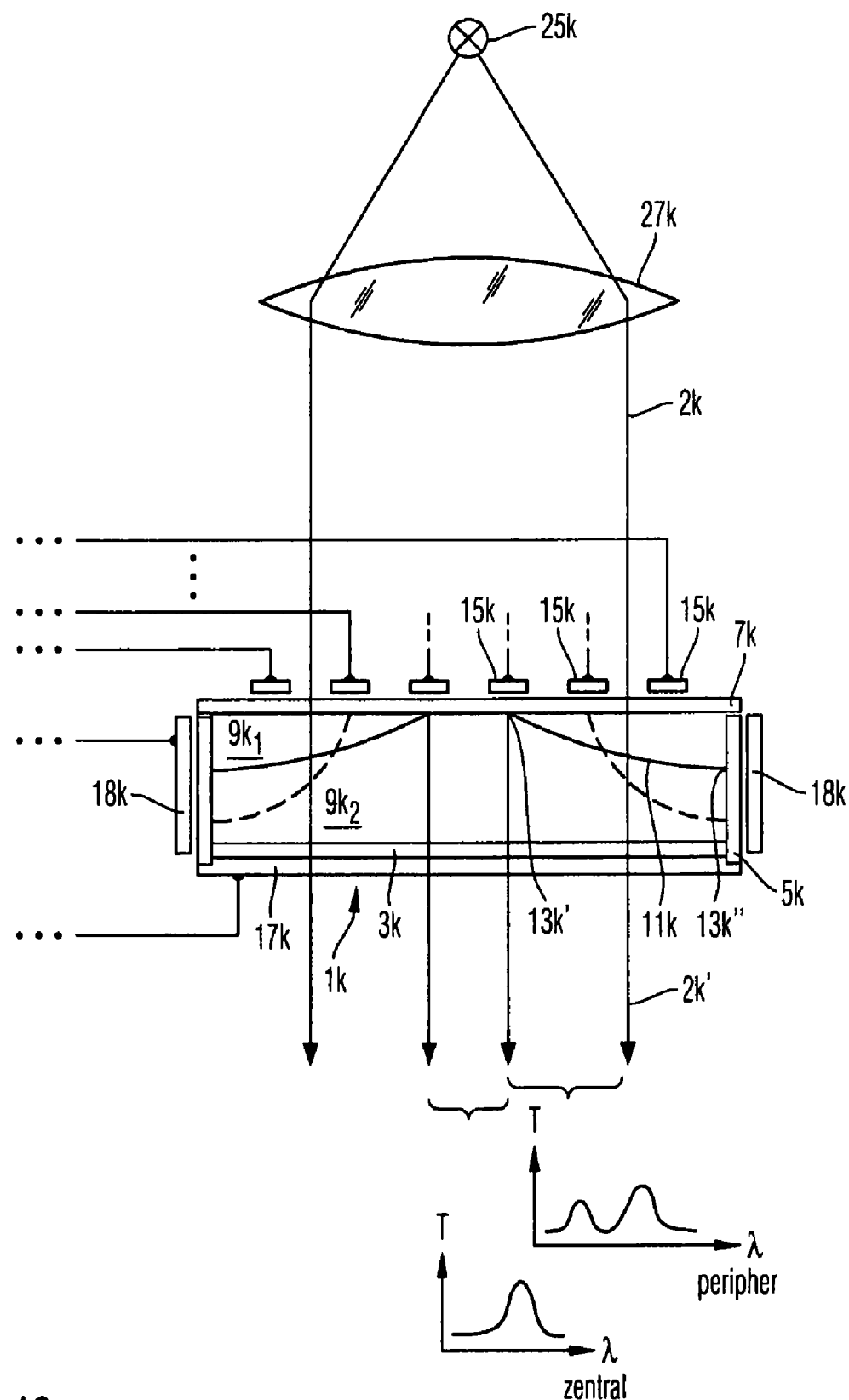
FIG. 13 depicts an inventive variable lens with different color fluids for providing an adjustable color filter.

In the variant of the arrangement in accordance with FIG. 12 that is depicted in FIG. 13, the transmission degrees are not, or are not only just integrally different, but above all are different in spectral areas; that is, $T_1(\lambda) \neq T_2(\lambda)$, whereby $\lambda$ represents the wavelength of the light and $T(\lambda)$ represents the spectral transmission degree. For instance, one of the fluids, $9k_2$, absorbs primarily in the blue and ultraviolet spectral range (that is, looks yellow-orange); the other, $9k_1$, absorbs primarily in the red and infrared spectral range (that is, looks greenish). The change in the voltages applied then has as its consequence that the filter effect of the fluids through which the light passes changes on the beam $2k'$ passing through (see spectra illustrated schematically in FIG. 13); this means that this arrangement provides an adjustable color filter.

In order to minimize undesired refractive effects in this variant, it can be advantageous in the application to select fluids with the most similar possible refractive indices $n_1$ and $n_2$, but with different colors. Using a physical beam splitter arranged downstream of the chamber, for instance in the form of a centrally arranged secondary mirror (not shown) that is inclined to the direction of the beam passing through, it is also possible to separate the central beam from the peripheral beam.

Additional applications are found in the field of ophthalmology in that for instance eye defects are compensated with the freely shapeable boundary surface in accordance with the invention. The observation, measurement, and documentation of the eye, as well as the application of therapy radiation into the eye by means of ophthalmological diagnostic and therapeutic devices can thus be significantly enhanced. One advantageous design is the provision of a high resolution ocular fundus camera. The microstructured formation of the electrode pattern is designed such that higher aberrations of the optical element can be intentionally adjusted, dynamically and variably. Dynamically variable refractive micro-optics are thus produced in the exceptional case of a flat basic structure.

The freely shapeable boundary surface also makes it possible to replace mechanical focussing, lens revolvers, and filter pivot devices, for instance in ocular fundus cameras and slit lamps. In the case of slit lamps, with a freely shapeable beam profile it is possible to produce for instance ophthalmological illumination with an individually adjustable profile. Furthermore, thanks to the adjustable beam profile, in another application it is possible to individually control the hardening of liquid plastics.

Moreover, using an ophthalmologic design in accordance with FIG. 11, it is possible to diffract a diagnostic or therapeutic beam and apply it to the eye. One advantageous design of a diagnostic device using the variable lens produces a scanning camera for the ocular fundus. One advantageous design of a therapeutic device using the variable lens produces a beam-guided laser for ablation of tissue in the eye.

Figure 15:
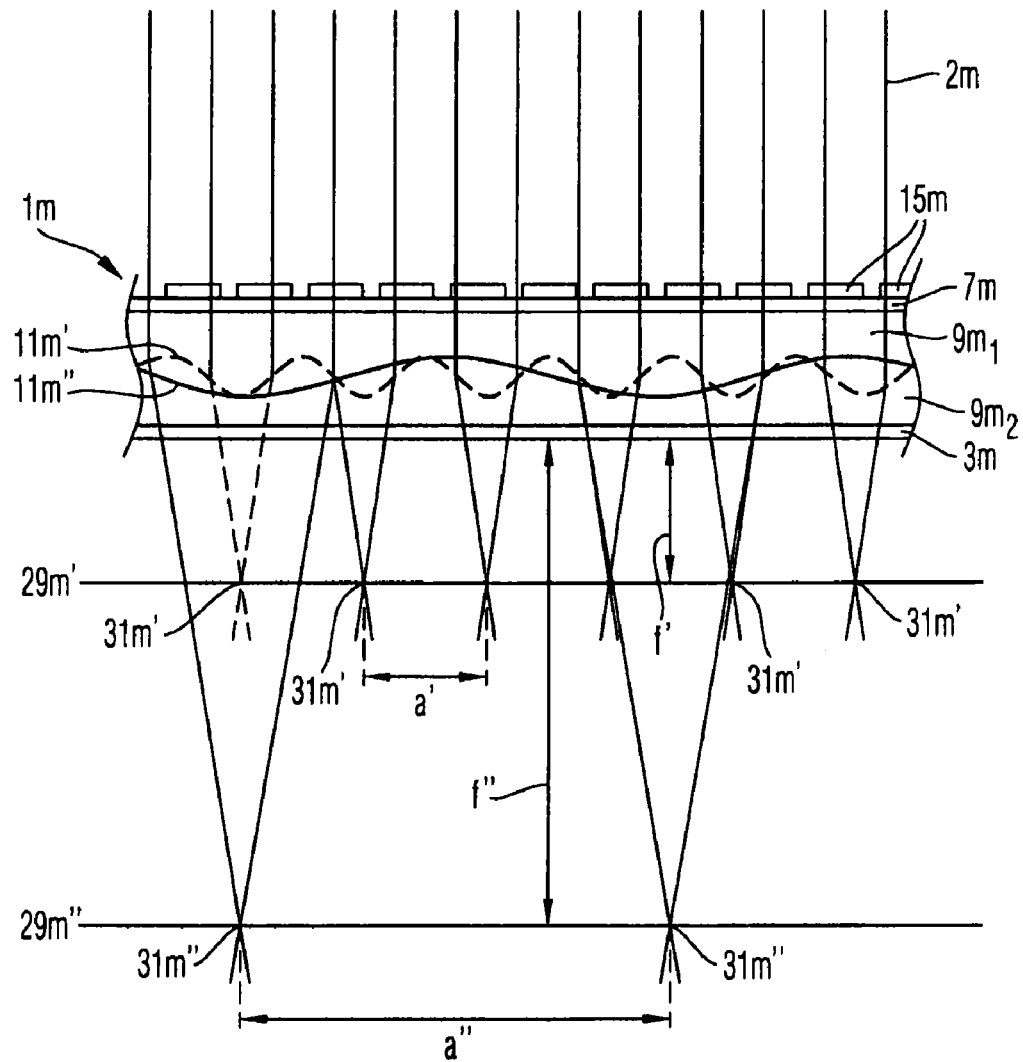

In the example shown in FIG. 15, a plurality of electrodes $15m$ are alternatingly activated such that a wavy boundary surface $11m'$ or $11m''$ results. The periodicity of the boundary surface waviness, and thus the distance $a'$ or $a''$ from associated focus points $31m'$ or $31m''$ in each of the focus planes $29m'$ and $29m''$ is determined by the periodicity of the activation (not shown). The amplitudes of the boundary surface waviness, and thus the distance $f'$ and $f''$ between each focus plane and the variable lens $1m$ is determined by the differences in the voltages applied.

With such an arrangement it is possible to produce a variable regulatable or static lens array with controllable focal length for the individual lenses and variable lens diameter (array resolution), for instance for a dynamic variable Shack-Hartmann sensor.

Using the inventive variable lens it has become possible to apply higher order aberrations to the dioptric base correction of the wavefront with the resolution of the electrode arrangement. Activation can be structured and oriented to Zernike polynomials, which mathematically describe higher order imaging errors (aberrations).

Therefore, using this novel variable lens it is possible to dynamically adjust nearly any desired correction of the wavefront with an optical element.

The variable lens can be added to any desired optical system, for instance as part of a zoom system. At a given focus (for instance sphere=10 dpt.), by modifying the spherical surface an ideal asphere or aberration-corrected lens can be adjusted for the specific imaging geometry in order to attain optimum imaging quality. This is adjustable as a result of the dynamic and variable properties of the inventive lens for any desired imaging geometries.

In another aspect, the invention includes a variable lens assembly for controllably influencing electromagnetic radiation that interacts with said lens. The lens assembly includes a container; a dielectric first fluid contained in the container; an electrically conductive second fluid contained in the container, wherein a phase boundary interface is formed between said first and said second fluid; at least one first electrode; at least one second electrode that is arranged relative to said first electrode such that an electrical voltage applied between said first electrode and said second electrode generates an electrical field that passes through said first fluid; wherein the container includes a first wall area on which at least one first electrode is arranged; wherein the phase boundary interface is adjacent to a second wall area that is different from said first wall area; and, wherein at all locations where said phase boundary interface is adjacent to said second wall area, the second wall area extends at an angle of more than 40° with respect to said first wall area.

Another embodiment of the invention includes a variable lens assembly for controllably influencing electromagnetic radiation that interacts with said lens. The lens assembly includes a container; a dielectric first fluid contained in the container; an electrically conductive second fluid contained in the container, wherein a phase boundary interface is formed between said first and said second fluid; at least one first electrode; at least one second electrode that is arranged relative to said first electrode such that an electrical voltage applied between said first electrode and said second electrode generates an electrical field that passes through said first fluid; wherein the container includes at least one wall area that is transparent for the electromagnetic radiation; wherein at least one first electrode is arranged on said transparent wall area.

In another embodiment, the phase boundary interface is adjacent to a second wall area that is different from the first wall area.

Another embodiment includes variable lens assembly for controllably influencing electromagnetic radiation that interacts with the lens. The lens assembly includes: a container; a dielectric first fluid contained in the container; a reflective, second fluid contained in the container, wherein a phase boundary interface is formed between said first and said second fluid; at least one first electrode; at least one second electrode that is arranged relative to the first electrode such that an electrical voltage applied between said first electrode and said second electrode generates an electrical field that passes through said first fluid. In this embodiment the reflective second fluid can be metallic.

In summary, the invention provides a variable optical element, the variability of which is based at least partially on the influence of an electrical field on the boundary limit of one dielectric fluid to another fluid.

The invention claimed is:

1. A variable lens for controllably influencing electromagnetic radiation that interacts with said lens, wherein said lens includes a container;
a first dielectric fluid contained in said container;
a second dielectric fluid contained in said container, wherein a phase boundary interface is formed between said first and said second fluid and wherein a dielectric constant of said first fluid is different from a dielectric constant of said second fluid;
at least one first electrode;
at least one second electrode that is arranged relative to said first electrode such that an electrical voltage applied between said first electrode and said second electrode generates an electrical field that passes through said phase boundary interface;
wherein for $$\Delta\in = 2*|\in 1 - \in 2|/(\in 1 + \in 2)$$

$$\Delta\in > 0.1$$

wherein
$\in 1$ represents the dielectric constant of said first fluid;
$\in 2$ represents the dielectric constant of said second fluid;
$\Delta\in$ represents a relative difference between said dielectric constants of said first fluid and said second fluid.

2. The variable lens in accordance with claim 1, wherein: $\Delta\in > 0.3$.

3. The variable lens in accordance with claim 1, wherein: $\Delta\in > 0.5$.

4. The variable lens in accordance with claim 1, wherein: $\Delta\in 0.7$.

5. The variable lens in accordance with claim 1, wherein: $\Delta\in > 0.9$.

6. The variable lens in accordance with claim 1, wherein the at least one first electrode is transparent for the electromagnetic radiation.

7. The variable lens in accordance with claim 1, wherein said first fluid or/and said second fluid is a liquid.

8. The variable lens in accordance with claim 1, wherein said first electrode and said second electrode are arranged on mutually opposing sides of said container.

9. The variable lens in accordance with claim 8, further comprising a first transparent wall area and a second transparent wall area and wherein said first and/or second transparent wall area possesses a transparent electrode array that microstructurally shapes a planar or quasi-spherical surface of the variable lens.

10. The variable lens in accordance with claim 1, wherein said phase boundary interface is arranged between said first electrode and said second electrode.

11. The variable lens in accordance with claim 1, wherein an interior wall of said container has a first surface area that has greater adhesion for said first fluid than for said second fluid, and wherein said interior wall of said container has a second surface area that has lower adhesion for said first fluid than for said second fluid.

12. The variable lens in accordance with claim 11, wherein said first surface area and said second surface area are mutually adjacent, and said phase boundary interface is adjacent to at least one part of a boundary line between said first and said second surface area.

13. The variable lens in accordance with claim 12, wherein said boundary line is annularly closed and said phase boundary interface is adjacent to said boundary line around its entire circumference.

14. The variable lens in accordance with claim 11, wherein said container includes a first wall, a second wall opposing said first wall, and a circumferential wall that extends between said first wall and said second wall, and wherein said first surface area is provided on said first wall and said second surface area is provided on said circumferential wall.

15. The variable lens in accordance with claim 1, wherein said container includes at least one wall area that is transparent for the electromagnetic radiation.

16. The variable lens in accordance with claim 15, wherein said container includes at least a first and a second wall area that are transparent for the electromagnetic radiation, and wherein said phase boundary interface is arranged between said first wall area that is transparent for the radiation and said second wall area that is transparent for the radiation.

17. The variable lens in accordance with claim 16, wherein the electromagnetic radiation that interacts with the lens passes through said first wall area and said second wall area and said phase boundary interface.

18. The variable lens in accordance with claim 15, wherein said container includes at least one first wall area and one second wall area that are transparent for the electromagnetic radiation and that are arranged on the same side of said phase boundary interface.

19. The variable lens in accordance with claim 18, wherein the electromagnetic radiation that interacts with said lens passes through said first wall area and said second wall area and is reflected by said phase boundary interface.

20. The variable lens in accordance with claim 15, wherein the electromagnetic radiation that interacts with said lens passes through at least one transparent wall area, is reflected by said phase boundary interface, and then passes through said at least one transparent wall area.

21. The variable lens in accordance with claim 1, further comprising a first transparent wall area and a second transparent wall area and wherein said first and/or second transparent wall area possesses a transparent electrode array that microstructurally shapes a planar or quasi-spherical surface of the variable lens.

22. A variable lens for controllably influencing electromagnetic radiation that interacts with said lens, wherein said lens includes
   a container;
   a first dielectric fluid contained in said container;
   a second dielectric fluid contained in said container, wherein a phase boundary interface is formed between said first and said second fluid and wherein a dielectric constant of said first fluid is different from a dielectric constant of said second fluid;
   at least one first electrode;
at least one second electrode that is arranged relative to said first electrode such that an electrical voltage applied between said first electrode and said second electrode generates an electrical field that passes through said phase boundary interface;
   wherein for $$\Delta n = 2*|n1-n2|/(n1+n2)$$

$\Delta n > 0.01$ is assumed.
   wherein
   n1 represents the refractive index of said first fluid;
   n2 represents the refractive index of said second fluid;
   $\Delta n$ represents a relative difference between said refractive indices of said first fluid and said second fluid.

23. The variable lens in accordance with claim 22, wherein $\Delta n > 0.03$.

24. The variable-lens in accordance with claim 22, wherein $\Delta n > 0.06$.

25. The variable-lens in accordance with claim 22, wherein $\Delta n > 0.1$.

26. The variable lens in accordance with claim 22, wherein the at least one first electrode is transparent for the electromagnetic radiation.

27. The variable lens in accordance with claim 22, wherein said first fluid or/and said second fluid is a liquid.

28. The variable lens in accordance with claim 22, wherein said first electrode and said second electrode are arranged on mutually opposing sides of said container.

29. The variable lens in accordance with claim 22, wherein said phase boundary interface is arranged between said first electrode and said second electrode.

30. The variable lens in accordance with claim 22, wherein an interior wall of said container has a first surface area that has greater adhesion for said first fluid than for said second fluid, and wherein said interior wall of said container has a second surface area that has lower adhesion for said first fluid than for said second fluid.

31. The variable lens in accordance with claim 22, wherein said container includes at least one wall area that is transparent for the electromagnetic radiation.

32. The variable lens in accordance with claim 22, further comprising a first transparent wall area and a second transparent wall area and wherein said first and/or second transparent wall area possesses a transparent electrode array that microstructurally shapes a planar or quasi-spherical surface of the variable lens.

33. A variable lens for controllably influencing electromagnetic radiation that interacts with said lens, wherein said lens includes
   a container;
   a first dielectric fluid contained in said container;
   a second dielectric fluid contained in said container, wherein a phase boundary interface is formed between said first and said second fluid and wherein a dielectric constant of said first fluid is different from a dielectric constant of said second fluid;
   at least one first electrode;
   at least one second electrode that is arranged relative to said first electrode such that an electrical voltage applied between said first electrode and said second electrode generates an electrical field that passes through said phase boundary interface;
   wherein $$\Delta d = 2*|d1-d2|/(d1+d2)$$

$\Delta d < 0.1$,
   wherein
   $\Delta d$ represents a relative difference in density between said first fluid and said second fluid;
   d1 represents a density of said first fluid; and,
   d2 represents a density of said second fluid.

34. The variable lens in accordance with claim 33, wherein: $\Delta d < 0.03$.

35. The variable lens in accordance with claim 33, wherein $\Delta d < 0.01$.

36. The variable lens in accordance with claim 33, wherein $\Delta d < 0.003$.

37. The variable lens in accordance with claim 33, wherein the at least one first electrode is transparent for the electromagnetic radiation.

38. The variable lens in accordance with claim 33, wherein said first fluid or/and said second fluid is a liquid.

39. The variable lens in accordance with claim 33, wherein said first electrode and said second electrode are arranged on mutually opposing sides of said container.

40. The variable lens in accordance with claim 33, wherein said phase boundary interface is arranged between said first electrode and said second electrode.

41. The variable lens in accordance with claim 33, wherein an interior wall of said container has a first surface area that has greater adhesion for said first fluid than for said second fluid, and wherein said interior wall of said container has a second surface area that has lower adhesion for said first fluid than for said second fluid.

42. The variable lens in accordance with claim 33, wherein said container includes at least one wall area that is transparent for the electromagnetic radiation.

43. A variable lens for controllably influencing electromagnetic radiation that interacts with said lens, wherein said lens includes
   a container;
   a first dielectric fluid contained in said container;
   a second dielectric fluid contained in said container, wherein a phase boundary interface is formed between said first and said second fluid and wherein a dielectric constant of said first fluid is different from a dielectric constant of said second fluid;
   at least one first electrode;
at least one second electrode that is arranged relative to said first electrode such that an electrical voltage applied between said first electrode and said second electrode generates an electrical field that passes through said phase boundary interface;
   wherein said first electrode includes a plurality of partial electrodes that are separated from one another by interposed insulating spaces.

44. The variable lens in accordance with claim 43, further including at least one voltage source for adjusting electric potentials for the plurality of partial electrodes.

45. The variable lens in accordance with claim 44, wherein said voltage source includes a resistance network.

46. The variable lens in accordance with claim 43, wherein said container includes a first wall area, a second wall area opposing said first wall area, and a circumferential wall area that extends between said first wall area and said second wall area, and wherein said first electrode is provided on said first wall area and said second electrode is provided on said second wall area.

47. The variable lens in accordance with claim 46, further comprising a third electrode on said circumferential wall area.

48. The variable lens in accordance with claim 43, wherein the at least one first electrode is transparent for the electromagnetic radiation.

49. The variable lens in accordance with claim 43, wherein said first fluid or/and said second fluid is a liquid.

50. The variable lens in accordance with claim 43, wherein said first electrode and said second electrode are arranged on mutually opposing sides of said container.

51. The variable lens in accordance with claim 43, wherein said phase boundary interface is arranged between said first electrode and said second electrode.

52. The variable lens in accordance with claim 43, wherein an interior wall of said container has a first surface area that has greater adhesion for said first fluid than for said second fluid, and wherein said interior wall of said container has a second surface area that has lower adhesion for said first fluid than for said second fluid.

53. The variable lens in accordance with claim 43, wherein said container includes at least one wall area that is transparent for the electromagnetic radiation.

54. The variable lens in accordance with claim 43, further comprising a first transparent wall area and a second transparent wall area and wherein said first and/or second transparent wall area possesses a transparent electrode array that microstructurally shapes a planar or quasi-spherical surface of the variable lens.

* * * * *

UNITED STATES PATENT AND TRADEMARK OFFICE
CERTIFICATE OF CORRECTION

PATENT NO. : 7,929,218 B2
APPLICATION NO. : 11/883287
DATED : April 19, 2011
INVENTOR(S) : Thomas Mohr, Manfred Dick and Juergen Kuehnert Page 1 of 1

It is certified that error appears in the above-identified patent and that said Letters Patent is hereby corrected as shown below:

On the Title Page

- Item (87) PCT Pub. No. Missing 'A1' designation.
- Item (30) Foreign Application Priority data. Missing '.3' at end of number.
- Col. 4, line 61, "a" should be 'α'.
- Col. 8, line 16, "2edoes not" should be '2e_does not'.
- Col. 9, line 19, "right comers" should be 'right corners'.
- Col. 12, line 29, claim 4. "Δε0.7" should be 'Δε>0.7'.
- Col. 8, line 27, "beam pass through" should be 'beam passes through'.
- Col. 9, line 22, "transverse to direction in which" should be 'transverse to the direction in which'.

Signed and Sealed this
Fifteenth Day of May, 2012

David J. Kappos
*Director of the United States Patent and Trademark Office*